(12) United States Patent
Kohno

(10) Patent No.: US 8,898,127 B2
(45) Date of Patent: Nov. 25, 2014

(54) DEVICE AND METHOD FOR ACQUIRING RESOURCE LOCK

(71) Applicant: International Business Machines Corporation, Armonk, NY (US)

(72) Inventor: Noriaki Kohno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/648,338

(22) Filed: Oct. 10, 2012

(65) Prior Publication Data

US 2013/0144853 A1    Jun. 6, 2013

(30) Foreign Application Priority Data

Dec. 2, 2011   (JP) .................................. 2011-264960

(51) Int. Cl.
G06F 7/00          (2006.01)
G06F 17/00       (2006.01)

(52) U.S. Cl.
USPC ........................................................ 707/704

(58) Field of Classification Search
None
See application file for complete search history.

(56) References Cited

U.S. PATENT DOCUMENTS

| | | | |
|---|---|---|---|
| 5,283,897 A | | 2/1994 | Georgiadis et al. |
| 7,360,030 B1 | | 4/2008 | Georgiev |
| 7,844,973 B1 | * | 11/2010 | Dice .............................. 718/108 |
| 2004/0002974 A1 | * | 1/2004 | Kravitz et al. ..................... 707/8 |
| 2007/0039000 A1 | | 2/2007 | Lakshmikantha et al. |
| 2008/0276025 A1 | * | 11/2008 | Cherem et al. ................ 710/200 |
| 2010/0122253 A1 | | 5/2010 | McCart |
| 2011/0153581 A1 | | 6/2011 | Kass |

FOREIGN PATENT DOCUMENTS

| | | |
|---|---|---|
| JP | 5012041 A | 1/1993 |
| JP | 5066972 A | 3/1993 |
| JP | 5257902 A | 10/1993 |
| JP | 6103091 A | 4/1994 |
| JP | 6332789 A | 12/1994 |
| JP | 2559915 B2 | 12/1996 |

(Continued)

OTHER PUBLICATIONS

Boyapati et al., "Ownership Types for Safe Programming: Preventing Data Races and Deadlocks", ACM Conference on Object-Oriented Programming, Systems, Languages and Applications (OOPSLA), Nov. 2002, pp. 211-230.

(Continued)

*Primary Examiner* — Uyen Le
(74) *Attorney, Agent, or Firm* — Douglas A. Lashmit; Hoffman Warnick LLC

(57) ABSTRACT

A lock control device receives a lock acquisition request from an application and transmits a lock acquisition request to a DBMS, receives a lock acquisition response from the DBMS, and transmits a lock acquisition response to the application, and each time, acquires statistical time information including the lock request counter, subsequent lock request counter, lock request time, lock acquisition time, initial lock acquisition time, and subsequent lock request time. The statistical processing device calculates the lock request count for each resource, subsequent lock request count for each resource, average lock wait time, and average lock acquisition delay expectation time, based on the statistical time information. Based on these values, the statistical processing device calculates an evaluation value which is the degree of expectation for the time eliminated from the lock wait time when lock acquisition is postponed, and outputs the lock order of the resources arranged in order of smallest evaluation value to a lock order table.

16 Claims, 9 Drawing Sheets

(56) References Cited

FOREIGN PATENT DOCUMENTS

| | | |
|---|---|---|
| JP | 10021098 A | 1/1998 |
| JP | 10143410 A | 5/1998 |
| JP | 2001084235 A | 3/2001 |
| JP | 2002007148 A | 1/2002 |
| JP | 2006252176 A | 9/2006 |
| JP | 2009037544 A | 2/2009 |

OTHER PUBLICATIONS

Simms, Patent Application No. GB1221512.5, Combined Search and Examination Report under Sections 17 and 18 (3), dated May 23, 2013, 5 pages.
Patent application GB 1221512.5, Examination Report dated Jul. 36, 2013, 2 pages.

* cited by examiner

FIG. 4

| Transaction ID | Resource ID | Lock request time | Lock acquisition time | Initial lock acquisition time | Subsequent lock request time | Lock request counter | Subsequent lock request counter |
|---|---|---|---|---|---|---|---|
| TR1 | B | T12 | T22 | | | 1 | |
| | A | T11 | T21 | T31 | T32 | 1 | 1 |
| | C | T13 | T23 | T31 | T33 | 1 | 1 |
| TR2 | : | : | : | : | : | : | : |
| | : | : | : | : | : | : | : |
| : | : | : | : | : | : | : | : |

(a)

(b)

DEVICE AND METHOD FOR ACQUIRING RESOURCE LOCK

TECHNICAL FIELD

The present invention relates to a device and method for acquiring a resource lock. In particular, the present invention relates to a device and method for acquiring resource locks for a plurality of resources in a specific order with regards to the plurality resources.

RELATED TECHNOLOGY

In the financial banking system and the like, there are cases where locks are applied to a plurality of data in a database and then updating is performed. For example, when performing an electronic funds transfer from account A to account B, locks are applied to the record of the database that holds the balance for account B and to the record of the database that holds the balance for account A, and then money is withdrawn from account A and deposited in account B. Incidentally, if a plurality of transactions that apply a plurality of locks are simultaneously executed, a deadlock will occur if the order of applying the locks is irregular. For example, if an electronic funds transfer from account A to account B is performed at almost the same time as an electronic funds transfer from account B to account A, and the locks for one transaction are applied in the order of account A, B and the locks for the other transaction are applied in the order of account B, A, the locks on both accounts A, B will not be released until commitment, so a deadlock is created.

A method is known for avoiding a deadlock where the lock order is determined such as by account number order for a plurality of resources that apply locks, and for processes that require locking. Locks are applied to all of the resources that require locking, in accordance with the locking order. Initially, the locking order of account A and account B is determined, for example, by account number order to be in order of account A and then account B. Furthermore, if an electronic funds transfer is performed from account A to account B, or if an electronic funds transfer is performed from account B to account A, in either case, locks of account A and account B are acquired in order of account A, B. Next, a process where funds are withdrawn from account A and funds are deposited in account B, or a process where funds are withdrawn from account B and funds are deposited in account A is performed.

Known technologies for determining the lock order in order to avoid deadlock are disclosed, for example, in Japanese Unexamined Patent Publication No. H6-103091, Japanese Unexamined Patent Publication No. 2002-7148, Japanese Unexamined Patent Publication No. H5-257902, Japanese Unexamined Patent Publication No. H6-332789, Japanese Unexamined Patent Publication No. H10-143410, Japanese Unexamined Patent Publication No. 2009-37544, and Japanese Unexamined Patent Publication No. H5-12041.

SUMMARY OF THE INVENTION

Deadlock can be avoided by using the aforementioned method that predetermines the lock order. However, there are problems with processing performance. When transactions that deposit funds or withdraw funds from a certain account are concentrated, the system throughput will be controlled by the time that the lock on the account is retained (lock retention time). For example, if the average lock retention time for a certain account is 0.02 seconds, the processes related to that account can only be performed at a maximum rate of 50 per second (=1/0.02). For an account where the processes are concentrated, the single lock retention time for that account is preferably as short as possible, but the aforementioned method has at least the following two problems.

Depending on the lock order, the wait time for acquiring another lock (lock waiting time) is included in the lock retention time. For example, if it has been previously determined that a lock will be acquired in the order of account A, B, the lock wait time for account B is included in the lock retention time for account A, and this is inconvenient when processes for account A are concentrated.

With the aforementioned method, a plurality of locks are acquired at the same time to start the process, but in order to shorten the lock retention time, the lock acquisition is preferably delayed until actually required. However, if it is predetermined that the locks will be acquired in order of account A, B, first the lock on account A must be acquired even if processing for account A is concentrated, and the lock retention time for account A cannot be shortened.

With a system that processes a large number of transactions and lock waiting is frequent, controlling the occurrence of these two problems and shortening the total lock occupation time in the entire system as much as possible can improve the throughput of the entire system. However, as disclosed in some of the above-referenced documents, the order for lock acquisition is predetermined, so the aforementioned two problems cannot be resolved. Furthermore, although existing systems can prevent a reduction in the performance of the system due to lock waiting, this technology does not provide a countermeasure for the aforementioned two problems.

The present invention shortens the time that resource locks are retained, for the entire system. In addition, the present invention shortens the lock wait time for other resources that is included in the time that the resource lock is retained, for the entire system. Even further, the present invention shortens the time until the resources are used, which is included in the time for retaining a resource lock, for the entire system.

The present invention provides a device for acquiring resource locks for a plurality of resources in a specific order for a plurality of resources, comprising:
a generating component that generates a time exclusion expectation which is an expectation for the length of time that is excluded from the time for retaining a lock on the resource for the case where acquisition of the resource lock is postponed, for each resource of a plurality of resources; and a determining component that determines a specific order such that resources with a higher time exclusion expectation generated by the generating component will be assigned later in the order.

Herein, the generating component may be a component that generates a time exclusion expectation that includes the lock wait time exclusion expectation which is the expectation for the length of lock waiting time for another resource, excluded from the time for retaining a lock on the resource for the case where acquisition of the resource lock is postponed, for each resource of a plurality of resources; or a component that generates a time exclusion expectation that includes a pre-use time exclusion expectation which is the expectation for the length of time until all resources are used, excluded from the time for retaining a lock on the resource for the case where acquisition of the resource lock is postponed, for each resource of a plurality of resources.

The device may further comprise a retrieving component that retrieves the number of times that acquisition of each resource lock has been requested by an application program that uses each resource of a plurality of resources wherein the generating component generates a lock retaining time exclusion expectation based on the number of times that each resource has been retrieved by the retrieving component, for each resource of the plurality of resources; or the device may further comprise a retrieving component that retrieves an acquisition time where software acquires a lock for each resource, and a request time where acquisition of the lock for each resource is requested for software that manages a plurality of resources for the case where an application program that uses various resources from a plurality of resources request acquisition of the resource lock; wherein the generating component generates a lock waiting time exclusion expectation based on the request time and the acquisition time retrieved by the retrieving component, for each resource of the plurality of resources.

Furthermore, the device may further comprise a retrieving component that retrieves the number of times that acquisition of each resource lock has been requested as the second or subsequent request for acquisition of a resource lock, by an application program that uses each resource of a plurality of resources; wherein the generating component generates a lock pre-use time exclusion expectation based on the number of times that each resource has been retrieved by the retrieving component, for each resource of the plurality of resources; or may further comprise a retrieval component that retrieves the acquisition time that each resource lock was acquired, for the case where acquisition of each resource lock is requested as a first request for acquisition of a resource lock, by an application program that uses each resource of a plurality of resources, and retrieves the request time for requesting acquisition of each resource lock, for the case where an application program request acquisition of each resource lock as the second or subsequent request for acquisition of a resource lock; wherein the generating component generates a pre-use time exclusion expectation based on the acquisition time and the request time retrieved by the retrieving component, for each resource of the plurality of resources.

Furthermore, the present invention provides a device for acquiring resource locks for a plurality of resources in a specific order for a plurality of resources, comprising: a memory that stores a pre-established order as a specific order; a retrieving component that for the case where acquisition of a specific resource lock has been requested as a first request for acquisition of resource lock by an application program that uses specific resources from a plurality of resources, retrieves as a first request time the time of a request for acquisition of locking other resources with regards to software that manages a plurality of resources, if other resources which are resources for which a lock is not being acquired and that are resources with a earlier order than specific resources, and are scheduled to be used by the application program, for a pre-established order, retrieves as the first acquisition time the time that another resource lock was acquired by the software, subsequently retrieves as the first request time the time that acquisition of a lock for specific resources was requested with regards to the software, retrieves as the first acquisition time the time that specific resource lock was acquired by the software, and retrieves as the second acquisition time the time that a specific resource lock was acquired; and for the case where acquisition of a specific resource lock has been requested as a second or subsequent request for acquisition of resource lock by an application program that uses specific resources from a plurality of resources, retrieves as the first request time the time of a request for acquisition of locking other resources with regards to software that manages a plurality of resources, if other resources which are resources for which a lock is not being acquired and that are resources with a earlier order than specific resources, and are scheduled to be used by an application program that manages a plurality of resources, for a pre-established order, retrieves as the first acquisition time the time that another resource lock was acquired by the software, subsequently retrieves as the second request time the time that acquisition of a specific resource lock was requested with regards to the software, retrieves as the first acquisition time the time that specific resource lock was acquired by the software, and retrieves as the first acquisition time the time that a specific resource lock was acquired; a generating component that generates a lock waiting time exclusion expectation which is an expectation for the length of time of waiting for locking of other resources that is excluded from the time of retaining the lock on each resource by postponing acquisition of each resource lock, based on the time retrieved as the first request time by the retrieving component based on each resource from a plurality of resources and based on the time retrieved as the first acquired time by the retrieving component, and generates a pre-use time exclusion expectation which is an expectation of the length of time until each resource is used excluding the time for retaining each resource lock by postponing acquisition of the locks for each resource, based on the time retrieved as the second request time by the retrieving component and the time retrieved as the second acquisition time by the retrieving component; and an updating component that updates the pre-established order recorded in the memory such that resources with a larger total expectation obtained based on the lock wait time exclusion expectation produced by the generating component and the pre-use time exclusion expectation are assigned to be later in the order.

Furthermore, the present invention provides a method for acquiring resource locks for a plurality of resources in a specific order for a plurality of resources, comprising: generating a time exclusion expectation which is an expectation for the length of time that is excluded from the time for retaining a lock on the resource for the case where acquisition of the resource lock is postponed, for each resource of a plurality of resources; and determining a specific order such that resources with a higher generated time exclusion expectation will be assigned later in the order.

Furthermore, the present invention provides a program causing function of the computer, as a device for acquiring resource locks for a plurality of resources in a specific order for a plurality of resources, wherein: the computer is made to function to generate a time exclusion expectation which is an expectation for the length of time that is excluded from the time for retaining a lock on the resource for the case where acquisition of the resource lock is postponed, for each resource of a plurality of resources; and determine a specific order such that resources with a higher time exclusion expectation generated by the generating component will be assigned later in the order.

The present invention can shorten the time that resource locks are retained, for the entire system.

BRIEF DESCRIPTION OF THE DRAWINGS

FIG. 4 is a diagram illustrating an example of a statistical report maintained by the lock control device of the data processing system according to an embodiment of the present invention.

FIG. 5-1 is a flowchart showing an operating example of the lock control device of a data processing system according to an embodiment the present invention.

FIG. 5-2 is a flowchart showing an operating example of the lock control device of a data processing system according to an embodiment the present invention.

DETAILED DESCRIPTION

Embodiments of the present invention are described below while referring to the attached drawings.

First a summary of the operation of the embodiment of the present invention is described.

In an embodiment of the present invention, the lock order is determined in a manner that can maximize the effect of not including the lock wait for other resources as much as possible in the lock retaining time (lock wait exclusion effect) and the effect of being able to delay lock acquisition until actually required (lock acquisition delay affect) using statistical report when resource locking is actually acquired. Furthermore, the resource lock retaining time where locking is concentrated is shortened by acquiring the lock based on the lock order, and therefore the total lock occupy time of the entire system is shortened, and thus the throughput of the entire system is enhanced.

In this case, the lock order is determined by either of the following two methods, using the statistical report of the system.

The first method is a method that is used when only the lock wait exclusion effect is expected. With this method, the number of lock requests in a certain time period is retrieved for each resource subject locking, and the locking order is based on the ascending order for the number of lock requests.

The second method is a method that is used when both the lock wait exclusion effect and the lock acquisition delay affect can be expected. With this method, the number of lock requests in a specific time period and the number of requests for subsequent locking in transactions during that period are retrieved, and the locking order is set to be the ascending order for the evaluation value calculated by the following formula:

$$\text{evaluation value} = \text{average lock wait time} \times \text{number of lock requests} + \text{average lock acquisition delay expected time} \times \text{number of subsequent lock requests}.$$

The average lock wait time and the average lock acquisition delay expected time can be determined beforehand by estimating, or can be determined by statistical processing.

Next, the configuration of the data processing system that performs this operation is described in detail.

Figure 1:
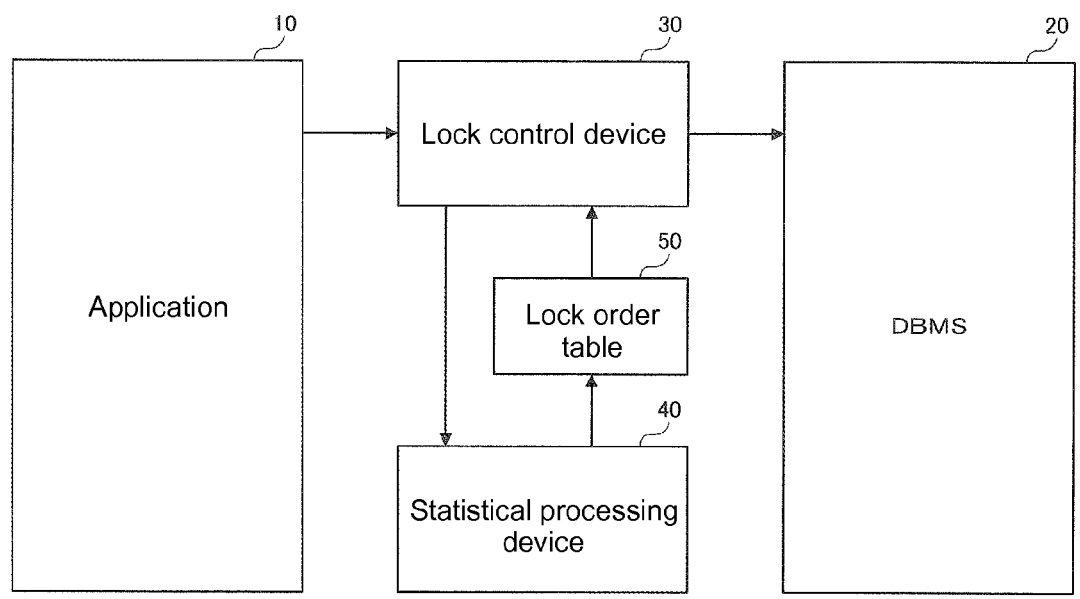
FIG. 1 is a block diagram showing an example of the overall configuration of a data processing system according to an embodiment the present invention.

FIG. 1 is a block diagram showing an example of the overall configuration of a data processing system according to an embodiment the present invention.

As illustrated in FIG. 1, the data processing system of the embodiment of the present invention is configured by establishing a lock control device 30, a statistical processing device 40, and a lock order table 50, established between the database management system (DBMS) 20 and the application program (hereinafter referred to as "application") 10.

Figure 2:
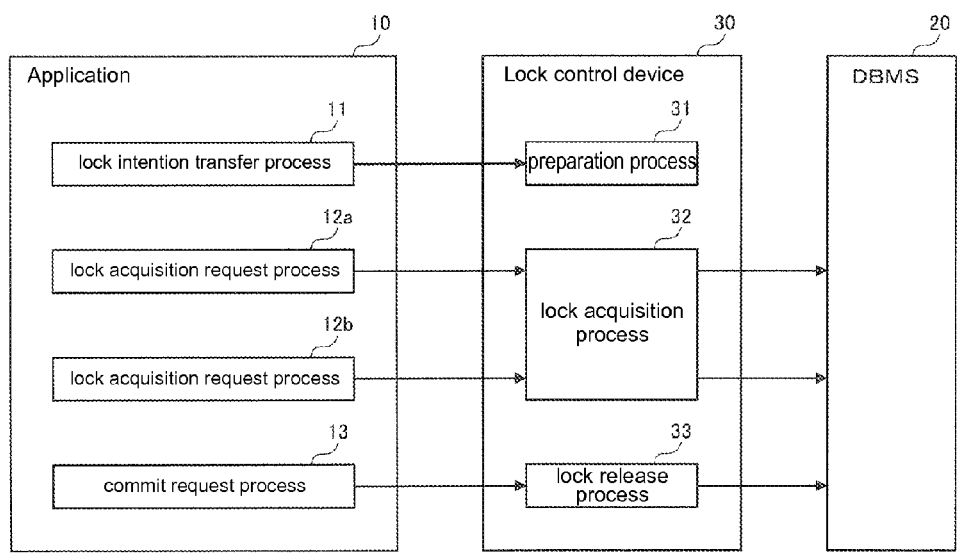
FIG. 2 is a diagram showing the relationship between an application of the data processing system, a lock control device, and DBMS, for an embodiment of the present invention.

Furthermore, in FIG. 2, the section including the application 10, DBMS 20, and lock control device 30 is extracted from the total configuration of the data processing system illustrated in FIG. 1, and the relationship of each component elements is illustrated. Hereinafter, the component elements of the data processing system of an embodiment of the present invention are described fully referring to FIG. 1 and FIG. 2.

The application 10 is a program that performs work processes, and as illustrated in FIG. 2, performs a lock intention transfer process 11, lock acquisition request process 12a, 12b, and a commit request process 13 with regards to the lock control device 30. Note, in FIG. 2, the lock acquisition request processes 12a, 12b are shown, but when there is no need to distinguish between these, they are referred to as lock acquisition request process 12. Furthermore, in FIG. 2, the case where the lock acquisition request process 12 is performed 2 times is shown, but the lock acquisition request process 12 can also be performed 3 or more times.

The lock intention transfer process 11 is a process that is performed at the beginning of a transaction, and is a process that notifies which resources in the database will be locked.

The lock acquisition request process 12 is a process that is performed at the moment resource locking is actually required, and is a process that requests acquisition of a lock on those resources.

The commit request process 13 is a process that is performed after using the lock resources in the database, and is a process that requests release of the lock on the resources by requesting a commit.

DBMS 20 is a program that manages the database that holds the resources subject to locking. Specifically, when use of resources on a database is requested, the resources are provided to the requesting source. Note, DBMS 20 can be a general resource management program that manages the resources subject to locking, but herein, DBMS 20 is used as a representative program. In other words, with the embodiment of the present invention, DBMS 20 is provided as an example of software that manages a plurality of resources.

The lock control device 30 performs a preparation process 31, a lock acquisition process 32, and a lock release process 33 as illustrated in FIG. 2, based on the assumption that a lock order table 50 has been prepared. The preparation process 31 is a process that is performed in accordance with the lock intention transfer process 11, and is a process that performs preparations for the lock acquisition process 32. Specifically, a lock order for all of the resources for which a lock intention has been transferred is read from the lock order table 50 and a lock subject list is created in ascending order of the lock order.

The lock acquisition process 32 is a process that is performed based on the lock acquisition request process 12 of the application 10, and is a process that acquires resource locks. Specifically, the requested resources are searched for in the lock subject list, and if there are resources with a smaller lock order number for which a lock has not been acquired, acquisition of those locks are requested to the DBMS 20 in ascending order of the lock order number. Next, the requested resource lock acquisition is requested to the DBMS 20. Furthermore, the resources for which a lock is being acquired are recorded on the lock subject list to have completed lock acquisition.

The lock release process 33 is a process that is performed based on the commit request process 13 of the application 10, and is a process that releases the resource lock. Specifically, a release on the lock on all of the resources that have been locked is requested to the DBMS 20. Furthermore, after the lock has been released, the lock subject list is deleted. Note, herein, the lock release process 33 is performed in accordance with the commit request process 13 of the application 10, but can also be performed by requesting a release of the lock using rollback.

The statistical processing device 40 obtains a statistical report by monitoring the actions of the lock control device 30, and determines the lock order based on this statistical report. A method of determining the lock order in the statistical processing device 40 is described below in detail. In the embodiments of the present invention, a statistical processing device 40 is provided as an example of a determining component that determines the order.

The lock order table 50 stores the lock order that was decided by the statistical processing device 40, and presents the lock order to the lock control device 30. The lock order table 50 can be achieved by a memory device that can be accessed at high speed by the lock control device 30, such as a main memory 90C (FIG. 8) or the like of a computer.

Note, in order to prevent deadlock, the lock order table must be fixed at a certain time. The statistical processing device 40 performs a daily or monthly statistical process for example, creates a new lock order table 50, and replaces the old lock order table 50 with the new lock order table 50. The timing for replacing the lock order table 50 can be determined if the lock order table 50 sufficiently expresses the average lock acquisition tendency for the application 10.

Furthermore, when the mechanism of an embodiment of the present invention is initially used, the lock order based on a statistical process has not yet been obtained, so the lock order can be determined by a human predicting and or thought to be effective, or by mechanically determining in accordance with account numbers or the like. Furthermore, after operating for a fixed period of time, the lock order table 50 created by the statistical processing device 40 can be substituted.

Next, the method of determining the lock order in the statistical processing device 40 is described in detail.

First, the method of determining the lock order can be selected from the following two determining methods, based on the properties of the application 10.

The first determining method is a method of determining based on the number of lock requests, and corresponds to the aforementioned first method.

For cases where the lock acquisition delay affect cannot be expected and only the lock wait exclusion effect can be expected, such as cases where almost no processes are included between the acquisition of a plurality of locks, a large lock wait exclusion effect can be obtained by postponing the lock acquisition of resources with a large number of lock request. Therefore, the statistical processing device 40 retrieves the number of lock requests in a certain time period for each resource subject to locking, and the locking order is based on the ascending order for the number of lock requests.

The second determining method is a method of determining based on the number of lock requests and the number of subsequent lock requests, and corresponds to the aforementioned second method.

For cases where both a lock wait exclusion effect and a lock acquisition delay effect can be expected, the statistical processing device obtains the number of lock requests in a specific time period and the number of requests for subsequent locking in transactions during that period are retrieved, and the locking order is set to be the ascending order for the evaluation value calculated by the following equation.

$$\text{evaluation value} = \text{average lock wait time} \times \text{number of lock requests} + \text{average lock acquisition delay expectation time} \times \text{number of subsequent lock requests.} \quad \text{(Equation 1)}$$

Herein, the evaluation value expresses the expectation value for the degree that the lock acquiring time of the entire system during a fixed period can be reduced, for the case where a specific resource lock acquisition is postponed. Specifically, the term "average lock wait time×number of lock requests" is the sum of the expectation values for the amount of lock wait time that can be excluded if lock acquisition of a specific resource is postponed, and the term "average lock acquisition delay expectation time×the number of subsequent lock requests" represents the total expected value that lock acquisition can be delayed based on the relationship between lock acquisition of a specific resource and the timing for using the resource if postponed. Furthermore, an effect of shortening the lock retaining time for the entire system can be obtained by assigning a later lock order number to resources with a large wait effect or in other words resources with the large evaluation value.

Note, if the average lock wait time and the average lock acquisition delay expectation time values are already known or can be estimated, the statistical processing device 40 can retrieve the lock request count for all assets in a fixed period of time and the subsequent lock request count which is the number of lock requests from two or more times for a transaction in a fixed period of time, and the average value can be calculated in accordance with Equation 1.

On the other hand, if the value for the average lock wait time is not known and cannot be estimated, the statistical processing device 40 will retrieve the difference between the time required for lock acquisition (hereinafter referred to as "lock request time") and the actual time that a lock is acquired (referred to as the "lock acquisition time") from the lock control device 30 for all lock acquisitions in a fixed period of time, and then divide by the number of lock requests in the fixed period of time to obtain the average lock wait time. Furthermore, if the value for the average lock acquisition delay expectation time is not known and cannot be estimated, the statistical processing device 40 will retrieve the difference between the initial lock acquisition time (hereinafter referred to as the "initial lock acquisition time") and the time that a second or later lock acquisition request was issued for a transaction (hereinafter referred to as the "subsequent lock request time") from the lock control device 30 for the second and later lock acquisitions for a transaction, and then divide by the number of lock requests in the fixed period of time to obtain the average lock wait time.

Furthermore, in order to determine a more accurate lock order, the statistical processing device 40 can sum the individual lock wait times in place of multiplying the lock request count by the average lock wait time, and sum the individual lock acquisition delay expectation times in place of multiplying the average lock acquisition delay expectation time by the subsequent lock request count. In this case, the equation for calculating the evaluation value for determining the lock order is as shown below.

$$\text{evaluation value} = \Sigma \text{lock wait time} + \Sigma(\text{subsequent lock request time} - \text{initial lock acquisition time}) \quad \text{(Equation 2)}$$

where the first summation refers to the summation of the lock request issued for specific resources in a fixed period of time, and the second summation refers to the summation of the second and subsequent lock request for transactions that are issued with regards to specific resources during a fixed period of time.

However, (Equation 1) and (Equation 2) are only examples of equations for calculating the evaluation value. Any equation can be used so long as the value increases as the first term becomes larger, and the value increases as the second term becomes larger. For example, rather than simply adding the first term and the second term together as in (Equation 1) and (Equation 2), an equation where term 1 and term 2 are weighted and then added can also be used.

Note, herein the statistical processing device 40 determines by calculation the expectation value of the degree that the lock wait time can be eliminated if a specific resource lock acquisition is postponed (an example of the lock wait time exclusion expectation) and the expectation value of the degree that a lock acquisition can be postponed by the relationship to the timing for using the resource for the case where a lock acquisition for specific resource is postponed, and determines the expectation value of the degree that the lock occupation time can be eliminated from the overall system during the time. (An example of the time exclusion expectation and the overall expectation) by calculating based on these expectation values. However, these expectation values can be determined by searching values established beforehand in a table or the like, rather than by calculating the expectation value. In this regard, the statistical processing device 40 can be an example of a generating component that generates the lock wait time exclusion expectation, pre-use time exclusion expectation, and the time exclusion expectation.

Herein, the process where the lock control device 30 retrieves the statistical time information that is used by the statistical processing device 40 is described. Note, herein, an example of a case where the average lock wait time and the average lock acquisition delay expectation time are not already known nor can be estimated by "Equation 1" is described.

Figure 3:
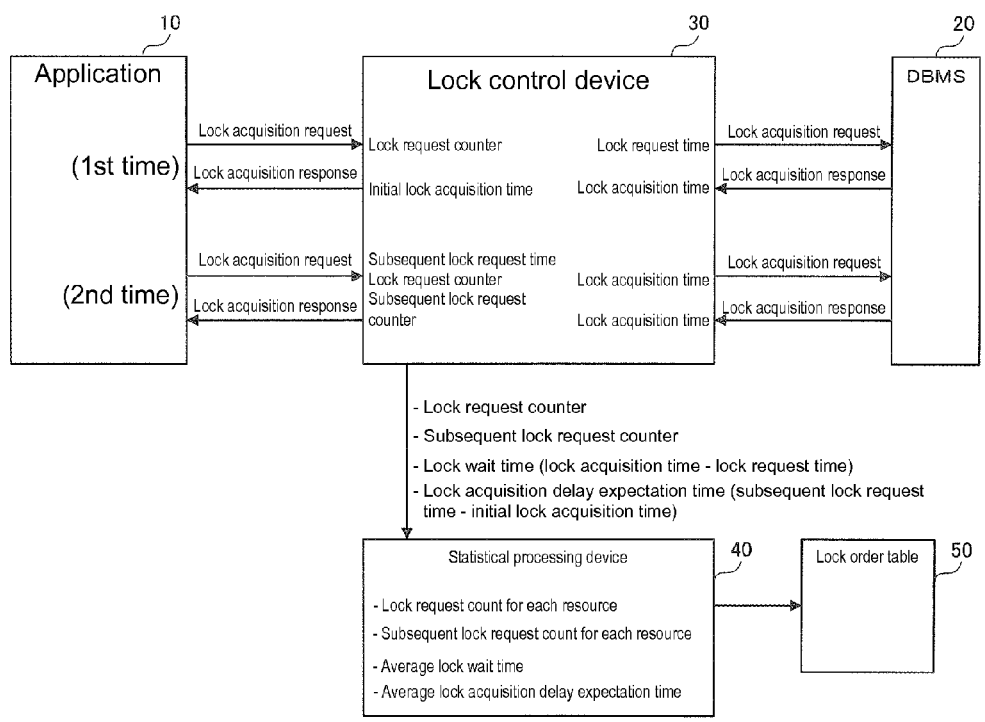
FIG. 3 is a diagram showing the condition of exchanging information between component elements of the data processing system of an embodiment of the present invention.

FIG. 3 is a diagram illustrating a condition of exchanging information between component elements of the data processing system illustrated in FIG. 1. In the diagram, the application 10 performs a second lock acquisition request.

First, the application 10 transmits the first lock acquisition request to the lock control device 30, and the lock control device 30 sets the lock request counter to "1". Furthermore, the lock control device 30 transmits a lock acquisition request for the requested resources to the DBMS 20, and at this time also records the lock request time.

On the other hand, when the lock acquisition response for the requested resources is received from the DBMS 20, the lock control device 30 records that time as the lock acquisition time. Furthermore, the lock control device 30 transmits the lock acquisition response to the application 10, and records that time as the initial lock acquisition time.

Next, when the application 10 transmits a second lock acquisition request to the lock control device 30, the lock control device 30 records that time as the subsequent lock request time, and sets the lock request counter and the subsequent lock request counter to "1". Furthermore, the lock control device 30 transmits a lock acquisition request for the requested resources to the DBMS 20, and at this time also records the lock request time.

On the other hand, when the lock acquisition response for the requested resources is received from the DBMS 20, the lock control device 30 records that time as the lock acquisition time. Furthermore, the lock control device 30 transmits the lock acquisition response to the application 10.

Note, in the foregoing, a lock acquisition request for only one requested asset was transmitted to the DBMS 20 from the application 10 for the first lock acquisition request. However, it is also possible for the application 10 to submit a lock acquisition request for a plurality of resources to the DBMS 24 the first lock acquisition request, such as the case where the lock order number in the lock subject list is small and there are resources where a lock has not yet been acquired. This case, the lock request time and the lock acquisition time are recorded for each lock acquisition request.

In this manner, the lock control device 30 retrieves the lock request time, lock acquisition time, subsequent lock request time, initial lock request time, lock request counter, and the subsequent lock request counter as statistical time information. Herein, the lock request time is the request time that lock acquisition of a specific resource is requested with regards to the software, and the first request time is an example; the lock acquisition time is the acquisition time for acquiring a lock on a specific resource by the software, and the first acquisition time is an example; the initial lock acquisition time is an example of the second acquisition time where a lock on specific resources has been acquired for the case where acquisition of a lock on specific resources has been requested as the first resource lock acquisition request by the application program; and the subsequent lock request time is an example of the second request time when an acquisition lock of specific resources has been requested for the case where an acquisition lock of the specific resources has been requested as a second or subsequent request for lock acquisition of the resources by the application program. Furthermore, the lock request counter is an example for the number of times that a lock acquisition has been requested for a specific resource, and the subsequent lock request counter is an example for the number of times that a lock acquisition has been requested for specific resources as a second or subsequent request for lock acquisition of the resources by the application program. Furthermore, the lock control device 30 is an example of a retrieving component that retrieves the account, a retrieving component that retrieves the request time and the acquisition time, and a retrieving component that retrieves the first request time, first acquisition time, second request time, and second acquisition time.

Furthermore, the lock control device 30 records the statistical time information retrieved in a statistical time information memory built into the device and not shown in the drawings.

FIG. 4 is a diagram illustrating an example of the statistical time information that may be recorded by the statistical time information memory.

As illustrated in FIG. 4, the statistical time information is associated with the transaction ID, resource ID, lock request time, lock acquisition time, initial lock acquisition time, subsequent lock request time, lock request counter, and subsequent lock request counter.

The transaction ID is information that distinguishes a transaction, which is a single processing unit consisting of a plurality of processes where an application 10 uses the resources of a database.

The resource ID is information that distinguishes the resources that are used by the application 10.

The lock request time is the time that a lock acquisition was requested to the DBMS 20 by the lock control device 30, and the lock acquisition time is the time that the DBMS 20 reports that a lock has been acquired by the lock control device 30.

The initial lock acquisition time is the time reported by the lock control device 30 that a lock has been acquired by the application 10, based on the first lock acquisition request from the application 10, and the subsequent lock request information is the time that the lock control device 30 receives a second or subsequent lock acquisition request from the application.

The lock request counter is a counter that records the fact that a lock acquisition request has been made by the application 10, and the subsequent lock request counter is a counter that records the fact that a second or subsequent lock acquisition request has been received from the application 10.

Next, the operation of the data processing system of the embodiment of the present invention is described.

The data processing system has an application 10 that transfers a plurality of lock subject resources to a lock control device 30 during a lock intention transfer process 11. Therefore, the lock control device 30 generates a lock subject list by arranging a plurality of lock subject resources transferred from the application 10 during a preparation process 31 in accordance with the lock order in the lock order table 50. Hereinafter, a case is described where a lock subject list that arranges resources "A", "B", and "C" in this order is generated.

Next, the application 10 transmits a lock acquisition request to the lock control device 30 in a lock acquisition request process 12. Then, the lock control device 30 performs the lock acquisition process 32.

Figures 1, 5:
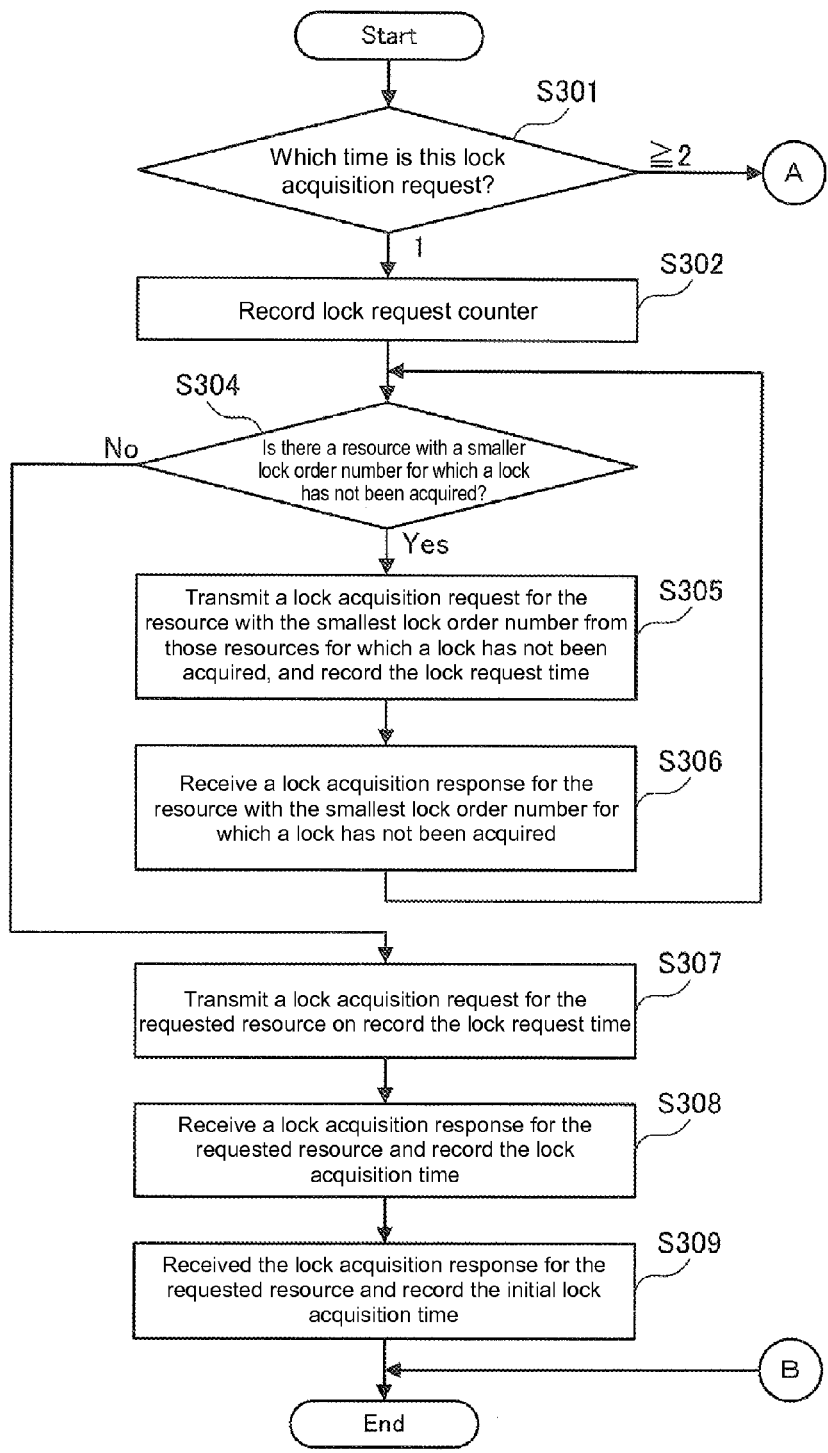
Figures 2, 5:
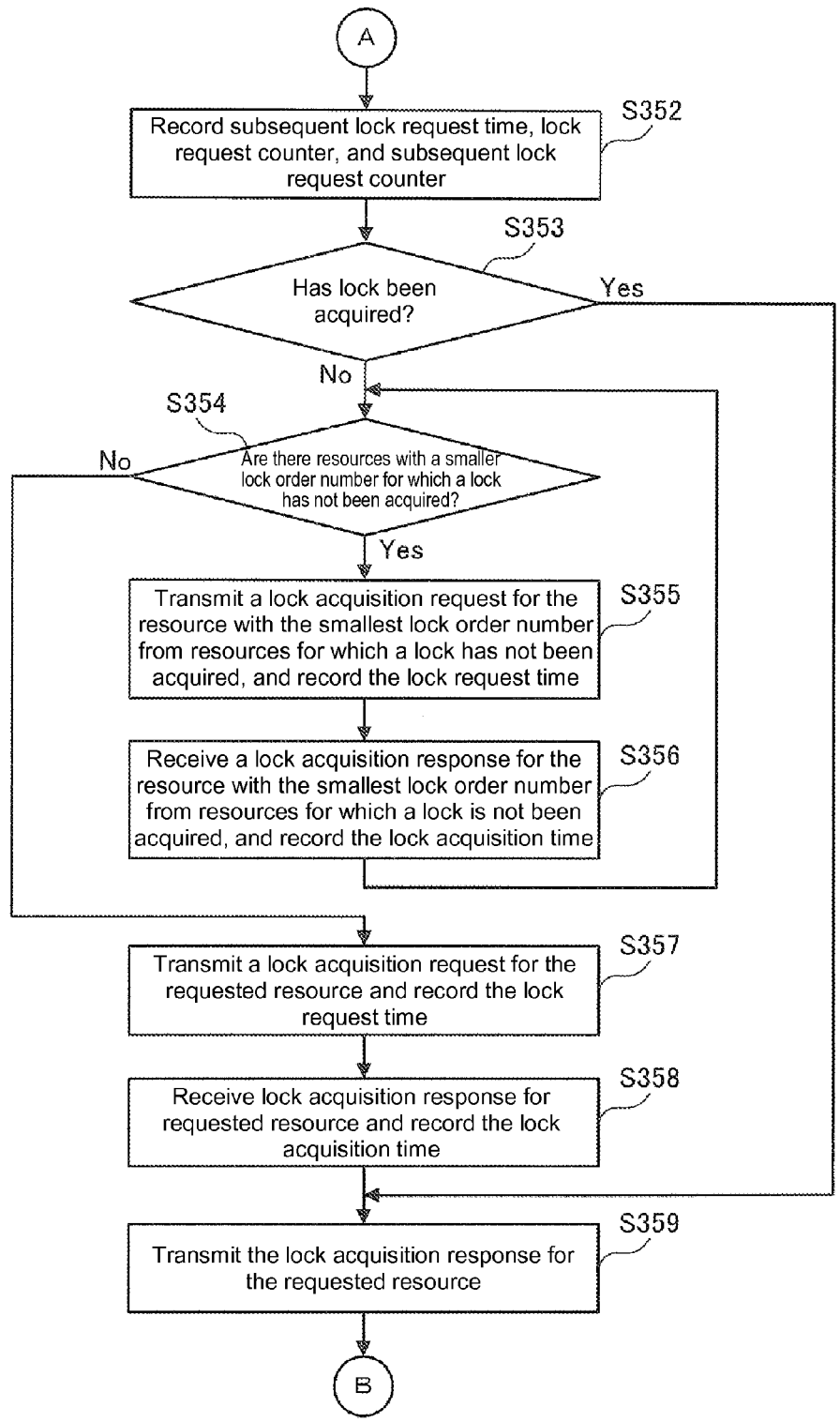

FIG. 5-1 and FIG. 5-2 are flowcharts illustrating an operating example of a lock control device 30 at this time.

As illustrated in FIG. 5-1, the lock control device 30 determines how many times this lock acquisition request has been made (step 301).

Herein, if it is determined that this lock acquisition request is the first lock acquisition request, the following operations are performed.

The lock control device 30 records "1" in the lock request counter (step 302). For example, in FIG. 4, "1" is reported in the lock request counter for resource "B" that has been requested by a first lock acquisition request.

Next, the lock control device 30 refers to the lock order recorded in the lock order table 50, and determines if the lock order number is smaller than the currently requested resource, and determines whether or not the resource for which a lock is not been acquired is present on the lock subject list (step 304).

The result is that if it is determined that there is a resource on the lock subject list that has a smaller lock order number than the resource currently being requested and for which a lock has not yet been acquired are present, the lock control device 30 transmits to the DBMS 20 a lock acquisition request for the resources with the smallest lock order number from among these resources, and records that time as the lock request time (step 305). Furthermore, in response to this lock acquisition request, a lock acquisition response stating that a resource lock has been acquired is received by the DBMS 20, and that time is recorded as the lock acquisition time (step 306). For example, in FIG. 4, resource "B" has been requested by a first lock acquisition request, but resource "A" which has a smaller order number than resource "B" is present, so the lock request time "T11" and the lock acquisition time "T21" are recorded for resource "A".

Next, the process returns to step 304, and the lock control device 30 determines if there is a resource on the lock subject list with a lock order number that is smaller than the currently requested resource and for which a lock has not been acquired, and this process is performed until there are no such resources. Note, these determinations may be performed by recording that that the resources for which a lock has been acquired have been locked.

If the lock order number is smaller than the currently requested resource and it is determined that there are no resources for which a lock has not been acquired, the lock control device 30 transmits a lock acquisition request for the currently requested resource to the DBMS 20, and records this time as the lock request time (step 307). Furthermore, a lock acquisition response is received stating that a resource lock has been acquired by the DBMS 20 in response to the lock acquisition request, and the time is recorded as the lock acquisition time (step 308). For example, in FIG. 4, with regards to resource "B" for which a first lock acquisition request was requested, a lock request time "T12" and a lock acquisition time "T22" that are later than the lock acquisition time for resource "A" are recorded.

Furthermore, the lock control device 30 transmits to the application 10 a lock acquisition response stating that a lock has been acquired for the currently requested resource in response to the lock acquisition request, and the time is recorded as the initial lock acquisition time (step 309). For example, in FIG. 4, with regards to resource "B" for which a first lock acquisition request was requested, an initial lock request time "T31" is recorded. However, the initial lock acquisition time for resource "B" is later moved to the initial lock acquisition time another resource, so the initial lock request time column or resource "B" will be blank.

If it is determined that the current lock acquisition request in step 301 is a second or subsequent lock acquisition request, the following operation is performed.

As illustrated in FIG. 5-2, the lock control device 30 records "1" in the lock request counter and the subsequent lock request counter and also records the time as the subsequent lock request time (step 352). Note, the initial lock acquisition time for the resource for which a first lock acquisition request has been requested is moved to the column for the initial lock acquisition time for the currently requested resource. For example, in FIG. 4, with regards to the resource "A" for which a second lock acquisition request has been requested, the subsequent lock request time "T32" the lock request counter "1", and the subsequent lock request counter "1" are recorded, but the initial lock acquisition time "T31" that was recorded for resource "B" is also recorded.

Next, the lock control device 30 determines whether or not a lock for the currently requested resource has already been acquired (step 353). When acquiring a lock for a resource for which a lock has not yet been acquired in step 305 and step 306 of FIG. 5-1 or step 355 and step 356 in FIG. 5-2 described below, this type of determination is made because there is the possibility that a lock has already been acquired for the currently requested resource.

Herein, if it is determined that a lock has already been acquired for the currently requested resource, the process proceeds to step 359.

If it is determined that a lock has not been yet acquired for the currently requested resource, the lock control device 30 references the lock order recorded in the lock order table 50, and determines whether or not the lock order number is smaller than the currently requested asset and whether or not there is a resource for which a lock has not been acquired that is higher on the lock subject list (step 354).

As a result, if the lock order number is smaller than the currently requested resource and it is determined that there are resources for which a lock has not been acquired, the lock control device 30 transmits a lock acquisition request for the resource with the smallest order number to the DBMS 20, and records this time as the lock request time (step 355). Furthermore, a lock acquisition response is received stating that a resource lock has been acquired by the DBMS 20 in response to the lock acquisition request, and the time is recorded as the lock acquisition time (step 356).

Next, the process returns to step 354, and the lock control device 30 determines whether or not there is a resource on the lock subject list with a smaller lock order number than the currently requested resource and for which a lock has not yet been acquired, until such an asset no longer exists. Note, this determination can be performed by recording that a lock acquisition has been made for the resource for which a lock is been acquired from the resources on the lock subject list.

Furthermore, if the lock order number is smaller than the currently requested resource and it is determined that there are no resources for which a lock has not been acquired, the lock control device 30 transmits a lock acquisition request for the currently requested resource to the DBMS 20, and records this time as the lock request time (step 357). Furthermore, a lock acquisition response is received stating that a resource lock has been acquired by the DBMS 20 in response to the lock acquisition request, and the time is recorded as the lock acquisition time (step 358). For example, in FIG. 4, with regards to resource "C" for which a third lock acquisition request was requested, a lock request time "T13" and a lock acquisition time "T23" that are later than the lock acquisition time for resource "A" are recorded.

Furthermore, the lock control device 30 transmits to the application 10 a lock acquisition response stating that a lock has been acquired for the currently requested resource in response to the lock acquisition request (step 359).

When the lock control device 30 records statistical time information in this manner in the statistical time information recording component in the device, the statistical processing device 40 processes the statistical time information that was recorded in the statistical time information recording component.

Figure 6:
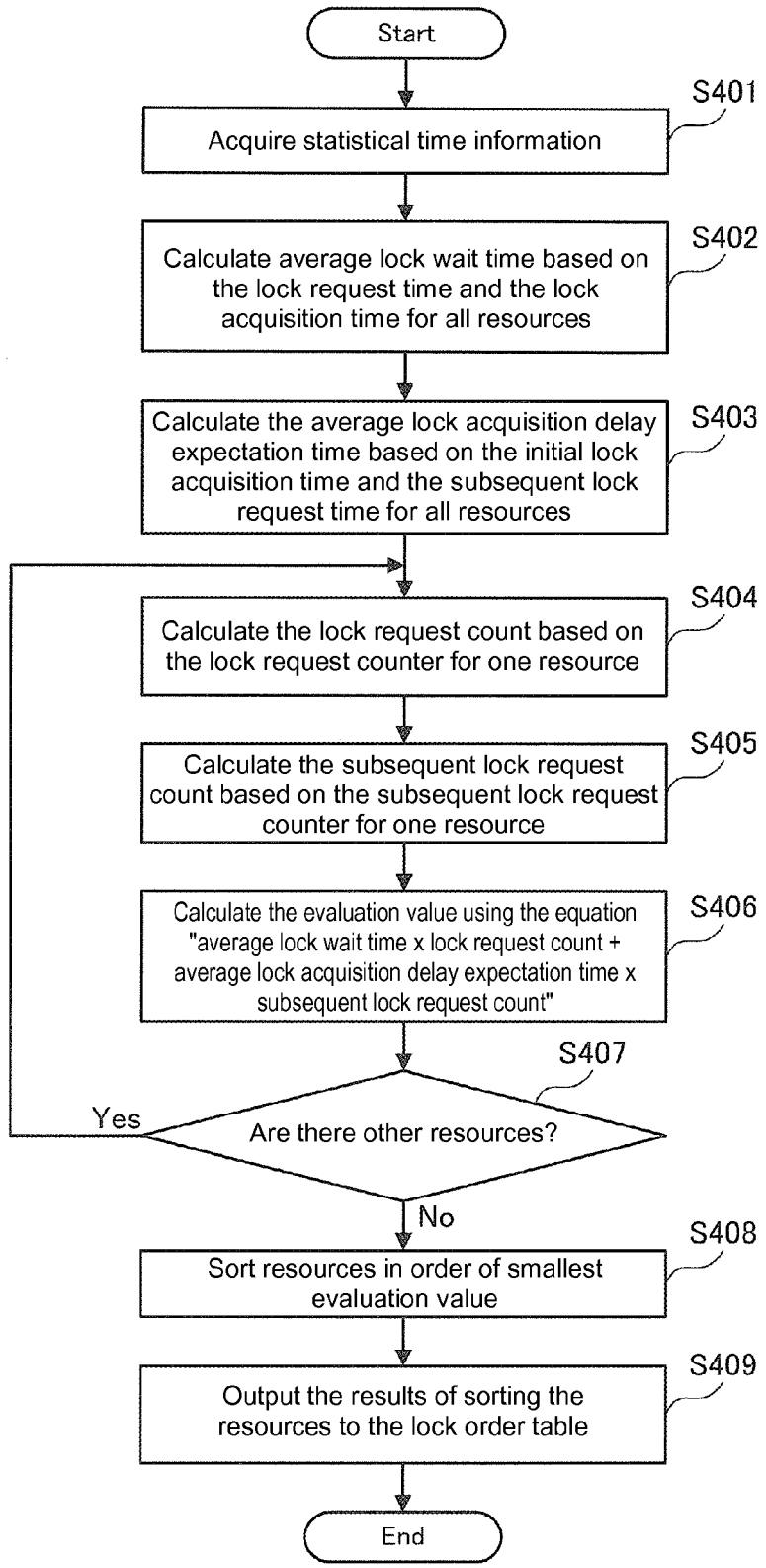
FIG. 6 is a flowchart showing an operating example of statistical processing device for the data processing system according to an embodiment the present invention.

FIG. 6 is a flowchart showing an operating example of the statistical processing device 40 at this time.

As illustrated in FIG. 6, the statistical processing device 40 retrieves statistical time information from the statistical time information recording component, and records in memory not shown in the drawings that is inside the device.

Next, the statistical processing device 40 calculates the average lock wait time based on the lock request time and the lock acquisition time for all of the resources that are included in the statistical time information (step 402). For example, when statistical time information of the form shown in FIG. 4 is recorded, the difference between the lock request time and the lock acquisition time is calculated for each combination of transaction ID and resource ID, and then the average lock wait time is calculated by dividing this difference by the number of combinations of transaction ID and resource ID.

Next, the statistical processing device 40 calculates the average lock acquisition delay expectation time based on the initial lock acquisition time and the subsequent lock request time for all of the resources that are included in the statistical time information (step 403). For example, when statistical time information of the form shown in FIG. 4 is recorded, the difference between the initial lock acquisition time and the subsequent lock request time is calculated for each combination of transaction ID and resource ID, and then the average lock acquisition delay expectation time is calculated by dividing this difference by the number of combinations of transaction ID and resource ID. However, in this case, combinations of transaction ID and resource ID for which an initial lock acquisition time and subsequent lock request time have not been recorded are not considered.

Next, the statistical processing device 40 focuses on one resource from all of the resources, and performs the following operation on this resource as the evaluation subject resource.

First, the statistical processing device 40 calculates the lock request count based on the lock request counter for the evaluation subject resource (step 404). For example, if statistical time information is recorded in a form illustrated in FIG. 4, a record containing the resource ID of the evaluation subject resource is extracted from the statistical time information, and the sum of the lock request counter for these records, or in other words the number of records, is determined and this value is used as the lock request count.

Furthermore, the statistical processing device 40 calculates the subsequent lock request count based on the subsequent lock request counter for the evaluation subject resource (step 405). For example, if statistical time information is recorded in a form illustrated in FIG. 4, a record containing the resource ID of the evaluation subject resource is extracted from the statistical time information, and the sum of the subsequent lock request counter for these records is determined and this value is used as the subsequent lock request count.

Furthermore, the statistical processing device 40 calculates the evaluation value for the evaluation subject resource using the equation "average lock wait time×lock request count+average lock acquisition delay expectation time×subsequent lock request count" (step 406). At this time, the value calculated in step 402 is used as the "average lock wait time", the value calculated in step 404 is used as the "lock request count", the value calculated in step 403 is used as the "average lock acquisition delay expectation time", and the value calculated in step 405 is used as the "subsequent lock request count".

Next, the statistical processing device 40 determines whether or not there are other resources for which an evaluation value has not been calculated (step 407).

As a result, if it is determined that there are resources for which an evaluation value has not been calculated, the process of steps 404 through 406 are repeated.

if it is determined that there are no resources for which an evaluation value has not been calculated, all of the resources are sorted in order of smallest evaluation value (step 408), and the sorted results are exported to the lock order table 50 (step 409).

Note, in this operating example, the lock control device 30 records the lock request counter that stores the fact that a lock acquisition request was received from the application 10, and the subsequent lock request counter that stores the fact that a second or subsequent lock acquisition request has been received from the application 10, and the statistical processing device 40 retrieves the lock request count by counting the lock request counters for each resource and retrieves the subsequent lock request count by counting the subsequent lock request counters for each resource, but this is not a restriction. The lock control device 30 may determine the lock request count by counting up the counters each time there is a lock acquisition request from the application 10, and determines the subsequent lock request count by counting up the counters each time there is a second or subsequent lock acquisition request.

Furthermore, in this operating example, the case where the average lock wait time and the average lock acquisition delay expectation time values in (Equation 1) were not already known and could not be estimated was used as an example, but this is not a restriction. For example, if the average lock wait time and the average lock acquisition delay expectation time values in (Equation 1) are already known or can be estimated or if (Equation 2) is used, the appropriate changes can be made.

First, the case where the average lock wait time and the average lock acquisition delay expectation time values in (Equation 1) are already known or can be estimated is described. In this case, values are assigned for the average lock wait time and the average lock acquisition delay expectation time, and there is no need to calculate these values based on the statistical time information. Therefore, the lock control device 30 does not need to acquire the lock request time, lock acquisition time, initial lock acquisition time, and subsequent lock request time, and the statistical processing device 40 does not need to perform step 402 and step 403.

Next, the case where (Equation 2) is used is described. In this case, the lock request count and the subsequent lock request count are not used, so the lock control device 30 does not need to acquire the lock request counter and the subsequent lock request counter. Furthermore, the statistical processing device 40 will not perform the processes of step 402 through step 405, and does not need to perform the process of calculating the value for "(lock acquisition time−lock request time)+(subsequent lock request time−initial lock acquisition time)". At this time, if a subsequent lock request time and an initial lock acquisition time are not recorded in the record that includes the resource ID of the evaluation subject resource, the term (subsequent lock request time−initial lock acquisition time) will be "0".

Therefore, with the present embodiment, the resources will be arranged in the lock order table 50 such that resources with a high expectation of reducing the lock acquisition time if the lock acquisition is postponed will be later. Therefore, deadlock will be prevented and there is the possibility that the performance will be enhanced.

Figure 7:
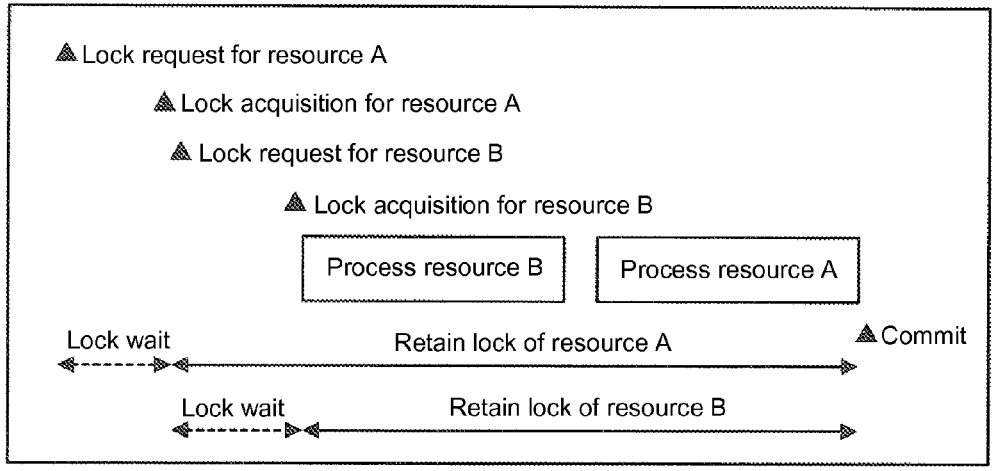
FIG. 7 is a diagram showing the effect of the data processing system according to an embodiment the present invention.
Figure 7:
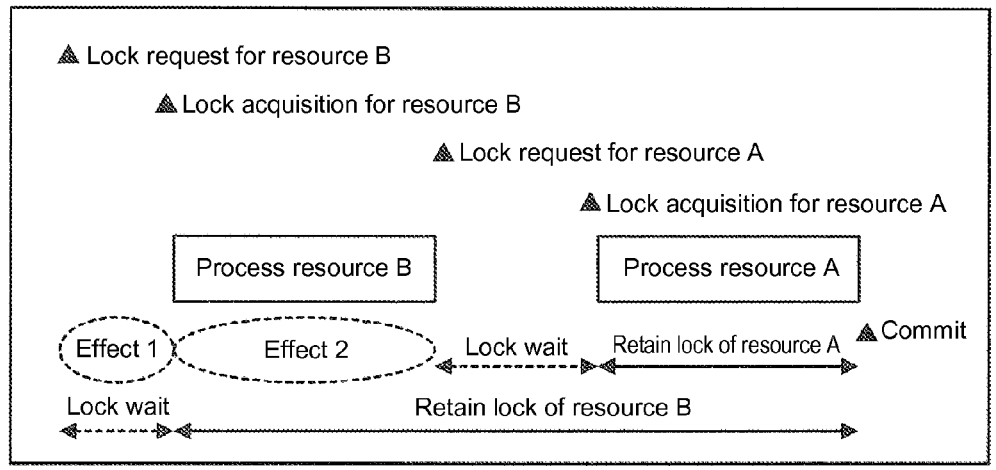

FIG. 7 is a diagram showing the results of shortening the lock retaining time for resource A by postponing lock acquisition of resource A:

(a) shows an example for the case where the lock order is determined to be in the order of resource A, B, where optimization was not performed;

(b) shows an example of the case where the lock order was optimized, and changed to the order of resource B, A.

Effect 1 in the broken line oval shows the (effect of eliminating the lock wait time as much as possible from the lock retaining time for the case where lock acquisition is postponed), and effect 2 in the broken line oval shows the "affect of eliminating as much as possible the time when a resource is not used from the lock retaining time for the case where lock acquisition is postponed).

Figure 8:
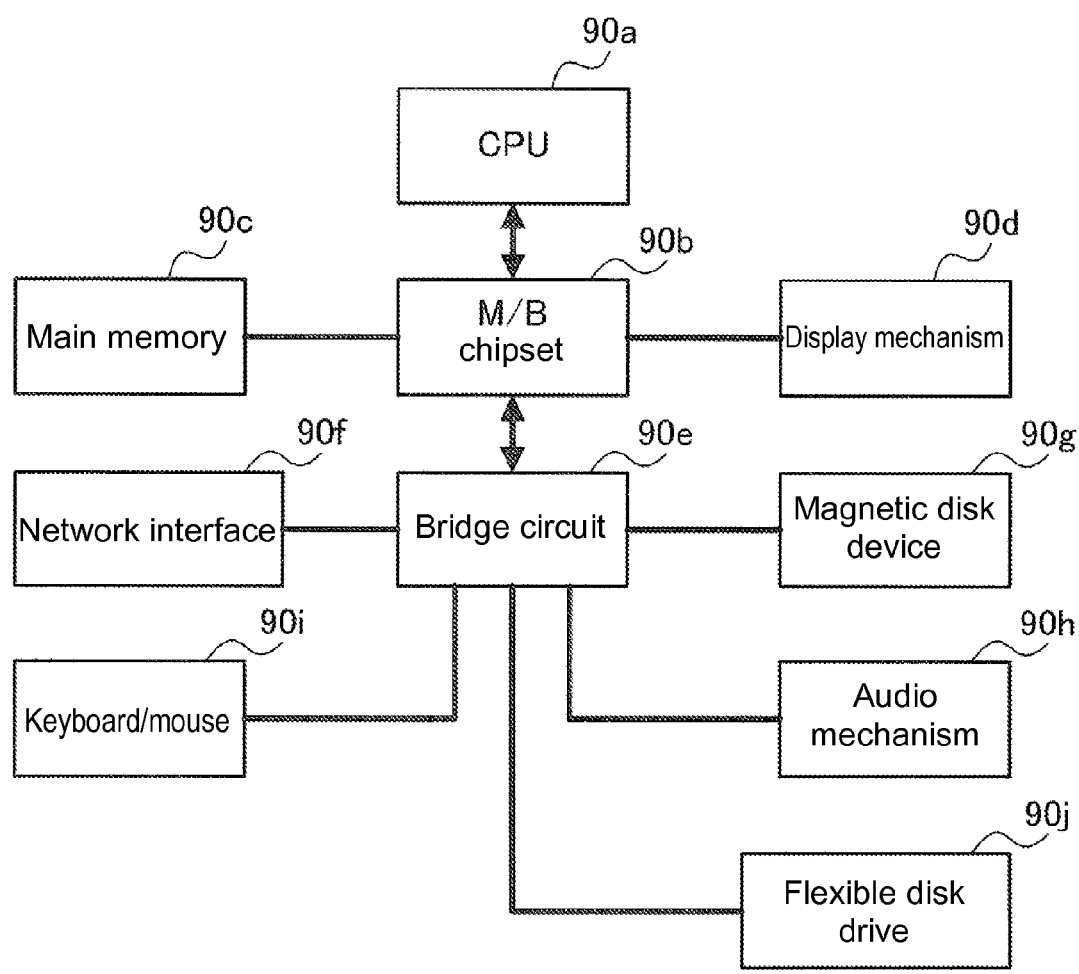
FIG. 8 is a diagram showing a hardware configuration for a computer that can apply the embodiments of the present invention.

Finally, a suitable computer hardware configuration for applying the embodiment of the present invention is described. FIG. 8 is a diagram illustrating an example of this type of computer hardware configuration. As illustrated in the diagram, the computer has a CPU (central processing unit) 90a, main memory 90c connected to the CPU 90a via a M/B (motherboard) chipset 90b, and a display mechanism 90d connected to the CPU 90a via the same M/B chipset 90b. Furthermore, a network interface 90f, a magnetic disk device (HDD) 90g, audio mechanism 90h, keyboard/mouse 90i, and flexible disk drive 90j are connected to the M/B chipset 90b via a bridge circuit 90e.

Note, in FIG. 8, the various component elements are connected via a bus. For example, CPU 90a and the M/B chipset 90b as well as the M/B chipset 90b and the main memory 90c are connected via a CPU bus. Furthermore, the M/B chipset 90b and the display mechanism 90d can be connected via an AGP (accelerated graphics Port), but if the display mechanism 90d contains a PCI express compatible video card, the M/B chipset 90b and the video card can be connected via a PCI express (PCIe) bus. Furthermore, when connecting the bridge circuit 90e, the network interface 90f can be PCI express for example. Furthermore, a serial ATA (AT Attachment), parallel transfer ATA, PCI (peripheral component interconnect) or the like can be used for the magnetic disk device 90g. In addition, USB (Universal serial bus) can be used for the keyboard/mouse 90i and the flexible disk drive 90j.

Herein, the present invention can be completely achieved using hardware, or can be completely achieved using software. Furthermore, the present invention can be achieved by using both hardware and software. Furthermore, the present invention can be achieved using a computer, data processing system, or computer program. The computer program can be provided by recording on a medium that is readable by a computer. Herein, examples of the medium include electronic, magnetic, optical, electromagnetic, infrared, or semiconductor system (device or equipment), or a propagation medium is conceivable. Furthermore, media that can be read by a computer includes semiconductors, solid-state memory devices, magnetic tape, removable computer diskette, random access memory (RAM), read-only memory (ROM), rigid magnetic disks, and optical discs. Examples of optical discs at the present time include compact disc read-only memory (CD-ROM), compact disc read/write (CD-R/W), and DVD.

The present invention was described above using an embodiment, but the technical scope of the present invention is not restricted to the aforementioned embodiments. It should be obvious to one skilled in the art that various changes and substitutions can be used without parting from the spirit and scope of the present invention.

What is claimed is:

1. A device for acquiring resource locks for a plurality of resources in a specific order, comprising:
   a computing device, comprising:
      a generating component for generating a time exclusion expectation, the time exclusion expectation comprising an expectation for a length of time that is excluded from a time for retaining a lock on a resource in a system in the case where acquisition of the resource lock is postponed based on statistics obtained by a statistical processing device, for each resource of a plurality of resources; and
      a determining component for shortening lock retaining time for the system by determining a specific order such that resources with a higher time exclusion expectation generated by the generating component are assigned later in the order.

2. The device according to claim 1, wherein the generating component generates a time exclusion expectation that includes a lock wait time exclusion expectation, the lock wait time exclusion expectation comprising the expectation for a length of lock waiting time for another resource, excluded from the time for retaining a lock on the resource when acquisition of the resource lock is postponed, for each resource of a plurality of resources.

3. The device according to claim 2, wherein the generating component generates a time exclusion expectation that includes a pre-use time exclusion expectation, the pre-use time exclusion expectation comprising the expectation for a length of time until all resources are used, excluded from the time for retaining a lock on the resource when acquisition of the resource lock is postponed, for each resource of a plurality of resources.

4. The device according to claim 3, the computing device further comprising a retrieving component that retrieves a number of times that acquisition of each resource lock has been requested by an application program that uses each resource of a plurality of resources;
wherein the generating component generates a lock retaining time exclusion expectation based on the number of times that each resource has been retrieved by the retrieving component, for each resource of the plurality of resources.

5. The device according to claim 3, the computing device further comprising:
a retrieving component that retrieves an acquisition time where software acquires a lock for each resource, and a request time where acquisition of the lock for each resource is requested for software that manages a plurality of resources when an application program that uses various resources from a plurality of resources request acquisition of the resource lock;
wherein the generating component generates a lock waiting time exclusion expectation based on the request time and the acquisition time retrieved by the retrieving component, for each resource of the plurality of resources.

6. The device according to claim 3, the computing device further comprising:
a retrieving component that retrieves a number of times that acquisition of each resource lock has been requested as a second or subsequent request for acquisition of a resource lock, by an application program that uses each resource of a plurality of resources;
wherein the generating component generates a lock pre-use time exclusion expectation based on the number of times that each resource has been retrieved by the retrieving component, for each resource of the plurality of resources.

7. The device according to claim 3, the computing device further comprising:
a retrieving component that retrieves the acquisition time that each resource lock was acquired, when acquisition of each resource lock is requested as a first request for acquisition of a resource lock, by an application program that uses each resource of a plurality of resources, and retrieves the request time for requesting acquisition of each resource lock, when an application program request acquisition of each resource lock as a second or subsequent request for acquisition of a resource lock;
wherein the generating component generates a pre-use time exclusion expectation based on the acquisition time and the request time retrieved by the retrieving component, for each resource of the plurality of resources.

8. A device for acquiring resource locks for a plurality of resources in a specific order for a plurality of resources, comprising:
a memory that stores a pre-established order as a specific order;
a computing device, comprising:
a retrieving component that when acquisition of a specific resource lock has been requested as a first request for acquisition of resource lock by an application program that uses specific resources from a plurality of resources, retrieves as the first request time a time of a request for acquisition of locking other resources with regard to software that manages a plurality of resources, if other resources which are resources for which a lock is not being acquired and that are resources with a earlier order than specific resources, and are scheduled to be used by the application program, for a pre-established order, retrieves as the first acquisition time a time that another resource lock was acquired by the software, subsequently retrieves as a first request time the time that acquisition of a lock for specific resources was requested with regard to the software, retrieves as the first acquisition time the time that specific resource lock was acquired by the software, and retrieves as the second acquisition time the time that a specific resource lock was acquired; and
for the case where acquisition of a specific resource lock has been requested as a second or subsequent request for acquisition of resource lock by an application program that uses specific resources from a plurality of resources, retrieves as the first request time the time of a request for acquisition of locking other resources with regard to software that manages a plurality of resources, if other resources which are resources for which a lock is not being acquired and that are resources with a earlier order than specific resources, and are scheduled to be used by an application program that manages a plurality of resources, for a pre-established order, retrieves as the first acquisition time the time that another resource lock was acquired by the software, subsequently retrieves as the second request time the time that acquisition of a specific resource lock was requested with regards to the software, retrieves as the first acquisition time the time that specific resource lock was acquired by the software, and retrieves as the first acquisition time the time that a specific resource lock was acquired;
a generating component that generates a lock waiting time exclusion expectation which is an expectation for the length of time of waiting for locking of other resources that is excluded from the time of retaining the lock on each resource by postponing acquisition of each resource lock, based on the time retrieved as the first request time by the retrieving component based on each resource from a plurality of resources and based on the time retrieved as the first acquired time by the retrieving component, and generates a pre-use time exclusion expectation which is an expectation of the length of time until each resource is used excluding the time for retaining each resource lock by postponing acquisition of the lock for each resource, based on the time retrieved as the second request time by the retrieving component and the time retrieved as the second acquisition time by the retrieving component; and
an updating component that updates the pre-established order recorded in the memory such that resources with a larger total expectation obtained based on the lock wait time exclusion expectation produced by the generating component and the pre-use time exclusion expectation are assigned to be later in the order.

9. A method for acquiring resource locks for a plurality of resources in a specific order for a plurality of resources, comprising:
generating, by a computing device, a time exclusion expectation, the time exclusion expectation comprising an expectation for a length of time that is excluded from a time for retaining a lock on the resource in a system in the case where acquisition of the resource lock is postponed based on statistics obtained by a statistical processing device, for each resource of a plurality of resources; and shortening, by the computing device, lock retaining time for the system by determining a specific order such that resources with a higher generated time exclusion expectation are assigned later in the order.

10. The method according to claim 9, wherein the generating generates a time exclusion expectation that includes a lock wait time exclusion expectation, the lock wait time exclusion expectation comprising the expectation for a length of lock waiting time for another resource, excluded from the time for retaining a lock on the resource when acquisition of the resource lock is postponed, for each resource of a plurality of resources.

11. The method according to claim 10, wherein the generating generates a time exclusion expectation that includes a pre-use time exclusion expectation, the pre-use time exclusion expectation comprising the expectation for a length of time until all resources are used, excluded from the time for retaining a lock on the resource when acquisition of the resource lock is postponed, for each resource of a plurality of resources.

12. The method according to claim 11, further comprising retrieving, by the computing device, a number of times that acquisition of each resource lock has been requested by an application program that uses each resource of a plurality of resources; wherein the generating generates a lock retaining time exclusion expectation based on the number of times that each resource has been retrieved, for each resource of the plurality of resources.

13. The method according to claim 11, further comprising:
retrieving, by the computing device, an acquisition time where software acquires a lock for each resource, and a request time where acquisition of the lock for each resource is requested for software that manages a plurality of resources when an application program that uses various resources from a plurality of resources request acquisition of the resource lock;
wherein the generating generates a lock waiting time exclusion expectation based on the request time and the retrieved acquisition time, for each resource of the plurality of resources.

14. The method according to claim 11, further comprising:
retrieving, by the computing device, a number of times that acquisition of each resource lock has been requested as a second or subsequent request for acquisition of a resource lock, by an application program that uses each resource of a plurality of resources;
wherein the generating generates a lock pre-use time exclusion expectation based on the number of times that each resource has been retrieved, for each resource of the plurality of resources.

15. The method according to claim 11, further comprising:
retrieving, by the computing device, the acquisition time that each resource lock was acquired, when acquisition of each resource lock is requested as a first request for acquisition of a resource lock, by an application program that uses each resource of a plurality of resources, and retrieves the request time for requesting acquisition of each resource lock, when an application program request acquisition of each resource lock as a second or subsequent request for acquisition of a resource lock;
wherein the generating generates a pre-use time exclusion expectation based on the retrieved acquisition time and the request time, for each resource of the plurality of resources.

16. A program stored on a non-transitory storage device, which when executed by a computing device, performs a method for acquiring resource locks for a plurality of resources in a specific order for a plurality of resources, the method comprising:
generating a time exclusion expectation, the time exclusion expectation comprising an expectation for a length of time that is excluded from a time for retaining a lock on the resource in a system in the case where acquisition of the resource lock is postponed based on statistics obtained by a statistical processing device, for each resource of a plurality of resources; and
shortening, by the computing device, lock retaining time for the system by determining a specific order such that resources with a higher generated time exclusion expectation are assigned later in the order.

* * * * *